(12) United States Patent
Townley-Smith et al.

(10) Patent No.: US 7,277,180 B2
(45) Date of Patent: Oct. 2, 2007

(54) OPTICAL CONNECTION FOR INTERFEROMETRY

(75) Inventors: Paul A. Townley-Smith, Irvine, CA (US); John Kondis, Costa Mesa, CA (US)

(73) Assignee: Zygo Corporation, Middlefield, CT (US)

( * ) Notice: Subject to any disclaimer, the term of this patent is extended or adjusted under 35 U.S.C. 154(b) by 205 days.

(21) Appl. No.: 10/984,545

(22) Filed: Nov. 9, 2004

(65) Prior Publication Data

US 2006/0098205 A1 May 11, 2006

(51) Int. Cl.
*G01B 11/02* (2006.01)
(52) U.S. Cl. ...................................... 356/487
(58) Field of Classification Search ........ 356/484–490, 356/493, 498, 500, 508–510
See application file for complete search history.

(56) References Cited

U.S. PATENT DOCUMENTS

| | | | | |
|---|---|---|---|---|
| 4,784,490 A * | 11/1988 | Wayne | ......................... | 356/487 |
| 4,950,078 A * | 8/1990 | Sommargren | ................ | 356/487 |
| 5,444,532 A * | 8/1995 | Sueyoshi | ..................... | 356/487 |
| 5,648,848 A * | 7/1997 | Aiyer | .......................... | 356/487 |
| 5,767,971 A * | 6/1998 | Kawai et al. | ................ | 356/493 |
| 5,917,844 A | 6/1999 | Hill | .............................. | 372/27 |
| 6,219,144 B1 * | 4/2001 | Hill et al. | .................... | 356/487 |
| 6,331,912 B1 * | 12/2001 | Au-Yeung et al. | ........... | 359/484 |
| 6,541,759 B1 * | 4/2003 | Hill | ........................ | 250/227.27 |
| 6,573,996 B1 * | 6/2003 | Deliwala et al. | ............. | 356/487 |
| 6,597,505 B1 | 7/2003 | Chaney et al. | .............. | 359/494 |
| 6,631,004 B1 * | 10/2003 | Hill et al. | ..................... | 356/487 |
| 6,806,961 B2 * | 10/2004 | Hill | .............................. | 356/487 |
| 6,806,962 B2 * | 10/2004 | Hill | .............................. | 356/493 |
| 6,856,402 B2 * | 2/2005 | Hill | .............................. | 356/487 |
| 6,900,899 B2 * | 5/2005 | Nevis | .......................... | 356/484 |
| 7,009,710 B2 * | 3/2006 | Sullivan et al. | .............. | 356/487 |
| 2002/0071181 A1 * | 6/2002 | Frisken | ........................ | 359/484 |
| 2002/0186914 A1 * | 12/2002 | Li | ................................. | 385/11 |
| 2003/0035112 A1 * | 2/2003 | Nevis | .......................... | 356/487 |
| 2003/0151750 A1 * | 8/2003 | Hill | .............................. | 356/517 |
| 2003/0164948 A1 * | 9/2003 | Hill | .............................. | 356/487 |
| 2003/0174921 A1 * | 9/2003 | Nevis | ........................... | 385/11 |
| 2005/0069242 A1 * | 3/2005 | Fujita et al. | .................. | 385/11 |
| 2005/0259325 A1 * | 11/2005 | Ghidini et al. | ............. | 359/487 |
| 2006/0087657 A1 * | 4/2006 | Holmes et al. | ............. | 356/487 |

* cited by examiner

*Primary Examiner*—Patrick Connolly
(74) *Attorney, Agent, or Firm*—Fish & Richardson P.C.

(57) ABSTRACT

A method including: (i) directing a beam to an interferometer head using an optical connection, the beam including a first beam component having a first polarization and a first frequency and a second beam component having a second polarization different from the first polarization and a second frequency; (ii) rotating the polarization of the first beam component to the second polarization; (iii) rotating the polarization of the second beam component to the first polarization; and (iv) returning the beam with the rotated polarizations from the interferometer head using the optical connection. For example, the step of directing may include: directing the first beam component into a first fiber of the optical connection; and directing the second beam component into a second fiber of the optical connection. The first beam component may be returned using the second fiber, and the second beam component may be returned using the first fiber.

42 Claims, 9 Drawing Sheets

OPTICAL CONNECTION FOR INTERFEROMETRY

TECHNICAL FIELD

This invention relates generally to interferometry, e.g., heterodyne interferometry, and more particularly to compensation of optical perturbations in an interferometry path from a remote source to a interferometer.

BACKGROUND

In heterodyne interferometry, a laser source generates a beam that includes two polarizations separated slightly in frequency (a "heterodyne beam"). The interference between the two polarizations in an interferometer provides a highly accurate measurement of the position of a measurement reflector relative to a reference reflector. By coupling the measurement reflector to a measurement object, the relative position of the measurement object can be determine with a similar degree of precision. Unfortunately, the generation of the heterodyne beam may produce heat and mechanical vibrations that can detrimentally affect the performance of the interferometer. The laser source may be placed at some distance from the interferometer in order to avoid these effects, but this in turn requires the use of some technique, such as a fiber optic connection, to transmit the laser beam from the laser source to the interferometer. Unfortunately, polarization mixing and birefringent optical effects, which disproportionately affect one polarization, when the heterodyne beam is transmitted to the interferometer can reduce the fidelity of the heterodyne interferometry measurement. Furthermore, such effects may vary based on temperature, mechanical vibrations, and other surrounding conditions, thus making it difficult to predict these effects in advance or to compensate for them.

SUMMARY

In general, in one aspect, the invention features a method including: (i) directing a beam to an interferometer head using an optical connection, the beam including a first beam component having a first polarization and a first frequency and a second beam component having a second polarization different from the first polarization and a second frequency; (ii) rotating the polarization of the first beam component to the second polarization; (iii) rotating the polarization of the second beam component to the first polarization; and (iv) returning the beam with the rotated polarizations from the interferometer head using the optical connection.

Embodiments of the method may include any of the following features.

The beam may be a heterodyne beam, with the second frequency being different from the first frequency. Alternatively, the beam may be a homodyne beam, the second frequency being equal to the first frequency.

The steps of rotating the polarization of the first beam and rotating the polarization of the second beam may be performed using at least one Faraday rotator.

The method may further include separating the first beam component from the second beam component; and the step of directing may include: directing the first beam component into a first fiber of the optical connection; and directing the second beam component into a second fiber of the optical connection. For example, the first fiber and the second fiber may be polarization-maintaining fibers. Also, the first beam component may be returned using the second fiber, and the second beam component may be returned using the first fiber.

Alternatively, the first beam component and the second beam component may be transmitted in the optical connection as a single beam, and the steps of rotating the polarization of the first beam and rotating the polarization of the second beam are performed simultaneously on the single beam.

The method may further include mixing the first beam component and the second beam component using a polarizer.

The interferometer head may be optically coupled to a measurement object, and the interferometer head may produce an interference signal indicative of a position of the measurement object. For example, the measurement object may be a wafer stage.

In general, in another aspect, the invention features an apparatus, including: (i) a laser module operable to generate a beam, the beam including a first beam component having a first polarization and a first frequency and a second beam component having a second polarization different from the first polarization and a second frequency; (ii) an interferometer head; (iii) an optical connection between the laser module and the interferometer head; and (iv) one or more optical rotators, wherein the one or more optical rotators are collectively operable to rotate the polarization of the first beam component to the second polarization and further operable to rotate the polarization of the second beam component to the first polarization.

Embodiments of the apparatus may include any of the following embodiments.

The beam may be a heterodyne beam, with the second frequency being different from the first frequency. Alternatively, the beam may be a homodyne beam, the second frequency being equal to the first frequency.

The one or more optical rotators may include one or more Faraday rotators.

The optical connection may include a first fiber and a second fiber. For example, the first fiber and the second fiber may be polarization-maintaining fibers.

The apparatus may further include a polarizer coupled to the laser module and the optical connection, the polarizer operable to mix the first beam component with the second beam component.

The apparatus may further include a measurement object optically coupled to the interferometer head, wherein the interferometer head is operable to produce an interference signal indicative of the position of the measurement object. For example, the measurement object may be a wafer stage.

In general, in another aspect, the invention features an apparatus, including: (i) a laser module operable to generate a beam, the beam including a first beam component having a first polarization and a first frequency and a second beam component having a second polarization different from the first polarization and a second frequency; (ii) an interferometer head; and (iii) an optical connection between the laser module and the interferometer head, the optical connection including a first fiber operable to direct the first beam component to the interferometer and a second fiber operable to direct the second beam component to the interferometer, wherein the interferometer head is configured to return the first beam component to the second fiber and to return the second beam component to the first fiber.

Embodiments of the apparatus may include any of the following features.

The beam may be a heterodyne beam, with the second frequency being different from the first frequency. Alternatively, the beam may be a homodyne beam, the second frequency being equal to the first frequency.

The interferometer head may include: a first port operable to receive the first beam component from the first fiber; a second port operable to receive the second beam component from the second fiber; a first optical rotator coupled to the first port operable to rotate the polarization of the first beam component; and a second optical rotator coupled to the second port operable to rotate the polarization of the second beam component.

The apparatus may further include a first beam expander coupled to the first optical rotator and a second beam expander coupled to the second optical rotator. For example, the optical rotators may include one or more Faraday rotators.

The interferometer head may be configured to receive the first beam component and the second beam component such that the first beam component and the second beam component travel within the interferometer head on different beam paths.

The interferometer head may include: a polarization splitter/combiner operable to receive the first beam component from the first fiber and the second beam component from the second fiber, and combine the first and second beam components into a combined beam; and an optical rotator operable to rotate the polarization of the first and second beam components in the combined beam. For example, the optical rotator may be a Faraday rotator.

The interferometer head may further includes a beam expander. For example, the beam expander may be coupled to the optical rotator. Alternatively, the beam expander may be disposed on a measurement path between the interferometer head and a measurement object. In such cases, the interferometer head may further include a collimator compensator plate disposed in a reference path of the interferometer to compensate for unequal phase effects between the reference path and the measurement path caused by the beam expander.

In general, in another aspect, the invention features an apparatus, including: (i) an input port operable to couple to a first polarization-maintaining fiber; (ii) an output port operable to couple to a second polarization-maintaining fiber; (iii) a first bi-directional port operable to couple to a third polarization-maintaining fiber; and (iv) a second bi-directional port operable to couple to a fourth polarization-maintaining fiber. The first bi-directional port is operable to transmit received light out of the output port when the received light is received from the third polarization-maintaining fiber and the light is polarized along the fast axis of the third polarization-maintaining fiber. The second bi-directional port is operable to transmit received light out of the output port when the received light is received from the fourth polarization-maintaining fiber and the light is polarized along the fast axis of the fourth polarization-maintaining fiber.

Embodiments of the apparatus may include any of the following features.

The apparatus may be configured to operate in the visible light range.

The apparatus may includes at least one Faraday rotator, at least one Wollaston prism, at least one walk-off crystal, and/or at least one half wave plate.

In general, in another aspect, the invention features an apparatus including an interferometer configured to separate an input beam into two components, direct one of the components to contact a measurement object twice along a common path, and then recombine the components to produce an output beam.

Embodiments of the apparatus may include any of the following features.

The apparatus may further include an optical rotator positioned to rotate polarizations of the components of the input beam along one direction and rotate polarizations of components of the output beam along a different direction. For example, the optical rotator may be a Faraday rotator.

The interferometer may include a polarizing beam splitter positioned to separate the input beam into the components and recombine the components to produce the output beam. The interferometer may further includes a pair of quarter wave plates, one of the quarter wave plates positioned to receive one of the components and the other of the quarter wave plates positioned to receive the other of the components. The interferometer may further include a retroreflector common to the components.

The components may have different polarizations.

The components may have a different frequencies, and the input beam may be a heterodyne beam. Alternatively, the components may have the same frequency, and the input beam may be a homodyne beam.

Embodiments of the invention may include any of the following advantages.

Certain embodiments of the present invention minimize polarization mixing and provide compensation for path-dependent effects, birefringent effects, and other optical effects that vary due to thermal and mechanical stresses on components of the interferometry measurement system. As a result, the accuracy of the interferometer can be preserved in a wide range of operating conditions.

Another technical advantage of certain embodiments of the present invention is adaptability. Various embodiments of interferometer heads, for example, may be adapted to work with conventional laser sources. This allows improved accuracy in such systems without requiring complete replacement of an existing system.

Yet another technical advantage of certain embodiments of the present invention is reduced size. For example, certain embodiments may use overlapping measurement and reference beams to reduce the overall size of the interferometer head. Components of the interferometer head, such as optical rotators and beam expanders, may be arranged so that the interferometer fits within a smaller area. Larger components may be relocated in the interferometer system in order to reduce the size of the interferometer.

The details of one or more embodiments of the invention are set forth in the accompanying drawings and the description below. Particular embodiments of the invention may include all, some, or none of the technical advantages enumerated above. Moreover, other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
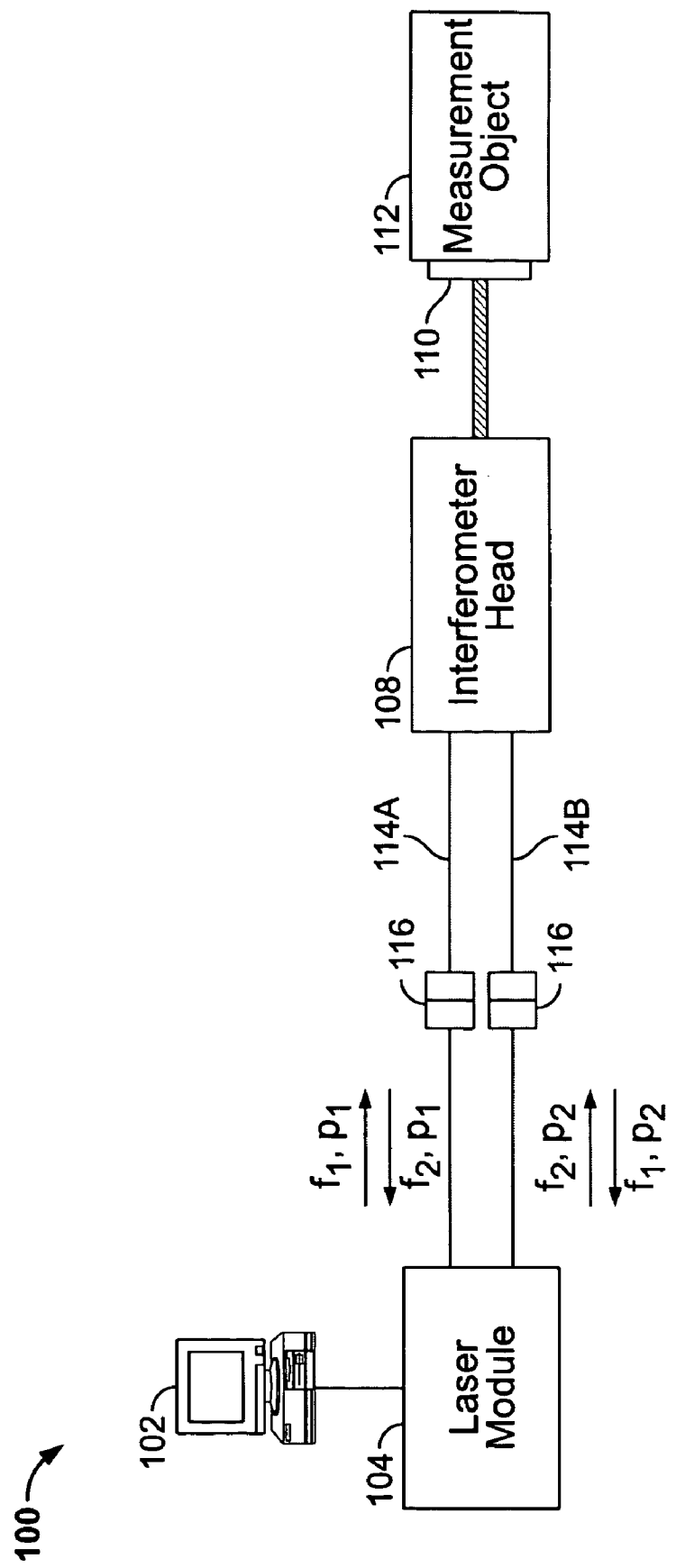
FIG. 1 illustrates a system for performing interferometry measurement.

FIG. 1 depicts a system 100 for performing heterodyne interferometry measurements. In the depicted embodiment, system 100 includes a computer 102, a laser module 104, and an interferometer head 108 connected to laser module 104 by two connections 114A and 114B formed using optical transmission media, henceforth referred to as optical paths 114A and 114B or collectively as optical paths 114. The interferometer head 108 permits interference measurements using light reflected from a reflector 110 (e.g., a plane mirror or a retroreflector) attached to a measurement object 112. This allows the position of measurement object 112 to be determined with a high degree of precision, which may in turn facilitate processes such as lithography, high-precision manufacturing, and related small-scale activities. For example, system 100 might be used to measure the location of a wafer stage or a mask used in semiconductor fabrication.

Heterodyne interferometry involves the use of a laser source that produces a beam including two polarization modes that are slightly separated from one another in frequency. For convenience, the two frequencies will be denoted as $f_1$ and $f_2$, while the corresponding polarizations will be referred to as $p_1$ and $p_2$. Because of the frequency separation between the polarizations, slight variations in the interference between beams of two polarizations are detectable as beats of the frequency gap between the two modes. Since the frequency separation is much smaller than the fundamental frequency of the laser beam, the degree of precision that can be obtained in frequency measurements is improved as compared to homodyne techniques.

During generation of the heterodyne beam, the laser source may generate heat, mechanical stress, vibrations, and other side effects of laser generation. These side effects may be of sufficient magnitude to interfere with the precise alignment of components whose position interferometer head 108 is used to monitor. Accordingly, it may be desirable to locate laser module 104 remotely from interferometer head 108, which requires the heterodyne beam from laser module 104 to be transmitted from laser module 104 to interferometer head 108.

There are several problems that may be involved in transmitting heterodyne beams through an optical medium. First, if the beams are traveling long distances in a transmission medium, there can be excessive mixing between the different polarization modes of each beam during transmission, which can disrupt the frequency/polarization relationship of the heterodyne beam. Second, the introduction of connectors into an optical path can contribute to additional polarization mixing when the beams encounter polarizing components. Third, there may be optical effects in the transmission medium that disproportionately affect one polarization (birefringent effects). This can cause the polarization modes to experience different effective optical paths, even though they may be communicated using the same medium. Because the effective optical path for each polarization mode is different, there can be phase differences between the two modes that distort the interference patterns formed by the two polarizations. Furthermore, variations in all of these effects caused by thermal expansion, mechanical vibration, replacement of components in the optical path, and numerous other changes in path properties make it difficult to systematically compensate for such effects. To some extent, resampling techniques may be used to compensate for these effects in the measurements, but it is more desirable to minimize these difficulties to the extent possible before applying such methods.

System 100 is configured to reduce or eliminate some or all of these problems associating with the transmission of heterodyne beams. Laser module 104 generates a heterodyne beam, separates the heterodyne beam into separate beams corresponding to polarization components $p_1$ and $p_2$, and transmits those beams on separate optical paths 114A and 114B, respectively. In preferred embodiments, the optical paths 114A and 114B are polarization maintaining optical fibers. Interferometer head 108 produces an optical interference signal using the beams and returns the beams to laser module 104. The use of separate fibers for each polarization mode reduces the problem of polarization mixing. Furthermore, a beam transmitted using one of optical paths 114 may be returned using the other optical path 114 so that each beam experiences the same overall physical path. This helps to correct for any path-dependent effects that might be introduced by transmitting the beams using separate fibers 114.

Even if beams transmitted using one optical path 114 are returned using the other optical path 114, there can still be differences in the effective optical path experienced by each beam because the beams have different polarizations. Birefringence or other effects that disproportionately affect one polarization can cause the beams to be subject to different effective optical paths even though the beams travel over the same overall physical path. Accordingly, it is desirable for the beams to be in the same polarization mode when they traverse a particular optical path 114, so that they are subject to equivalent optical effects. This may be accomplished by rotating the polarizations of the beam components before the beams are returned, so that the component of the beam having polarization $p_1$ is rotated to polarization $p_1$ on the return path, while the component of the beam having polarization $p_2$ is rotated to polarization $p_1$ on the return path, as illustrated in FIG. 1. Thus, the beam transmitted using optical path 114A returns in the same polarization mode as the beam originally transmitted to interferometer head 108 using optical path 114B.

Depending on the relative severity of the effects, such compensation techniques may be used together or separately. For example, if the distance between laser module 104 and interferometer head 108 is relatively short and includes few or no connectors 116, polarization mixing may be less serious, and it may be possible to use one optical path 114 in place of optical paths 114A and 114B, with the depicted arrangement and such alternative arrangements being referred to generally as an "optical connection." In another example, if optical paths 114 are relatively uniform in their optical effects on the different polarization modes of the heterodyne beam, rotation of the beam polarizations may not be necessary. Thus, although particular embodiments of system 100 may be described using one or more techniques that compensate for particular optical effects on the polarization modes of the heterodyne beam, it should be understood that other embodiments may use fewer techniques, more techniques, different techniques, or combinations of one or more techniques in place of or in addition to the described compensation techniques.

Turning now to particular features of the embodiment of system 100 depicted in FIG. 1, computer 102 may be any electronic device or system for storing and analyzing information. For example, computer 102 may be a personal computer (PC), laptop computer, server, network, or other similar device. Computer 102 receives measurements from laser module 104 and interprets the measurements to generate position information for measurement object 112. Computer 102 may include any suitable display, printout, or other output system for generating an output of the position information in graphical, auditory, numerical, electronic, or other suitable form. Computer 102 may also include suitable components for receiving information from a user, such as keyboards, touch pads, or network connections.

Laser module 104 is a collection of components for generating a laser beam used in heterodyne interferometry, transmitting one or more output beams to interferometer head 108, receiving returned beams from interferometer head 108, and performing interferometry measurements using the returned beams. Laser module 104 also includes components for receiving returned beams from interferometer head 108 and for measuring interference effects in the beams.

Interferometer head 108 refers to any collection of optical components used to produce interference between light beams. Interferometer head 108 may include lenses, mirrors, splitters, prisms, wave plates, rotators, crystals, collimators, or other optical components. Certain embodiments of interferometer head 108 have multiple optical ports for receiving multiple beams from optical connection 114. Such embodiments may receive a beam using a first optical port and return that beam using a second optical port. In general, interferometer head 108 reflects a light beam from reflector 110 on measurement object 112, thus producing an interference pattern based on the position of measurement object 112. Measurement object 112 may be any physical object to have its position in space measured in any dimension or dimensions. Reflector 110 may be any manner of reflective material, which may be integral to measurement object 112 or physically connected to measurement object 112 using any form of physical attachment, such as adhesives, fasteners, connecting members, or numerous other methods of attachment. In preferred embodiments, the polarizations of the two frequency components $f_1$ and $f_2$ are swapped with one another in interferometer head 108 prior to being returned to laser module 104 along optical paths 114A and 114B.

As noted above, optical paths 114A and 114B may be any optical communication medium forming a connection between laser module 104 and interferometer head 108. For example, optical paths 114 may be formed using any manner of optical fiber, wave guide, connector, lens, mirror, or numerous other components for transmitting light. In the interest of maintaining linear polarizations, optical paths 114 may include polarization-maintaining media, such as polarization-maintaining fibers. To further reduce the amount of polarization-mixing in optical connection 114, optical connection 114 may include, for example, physically separate optical paths 114 that are each used for one of the polarization modes of the heterodyne beam. Optical paths 114 may be secured to laser module 114 and interferometer head 108 using optical connectors, fusing, continuous connections, or numerous other methods for securing optical media.

Figure 2:
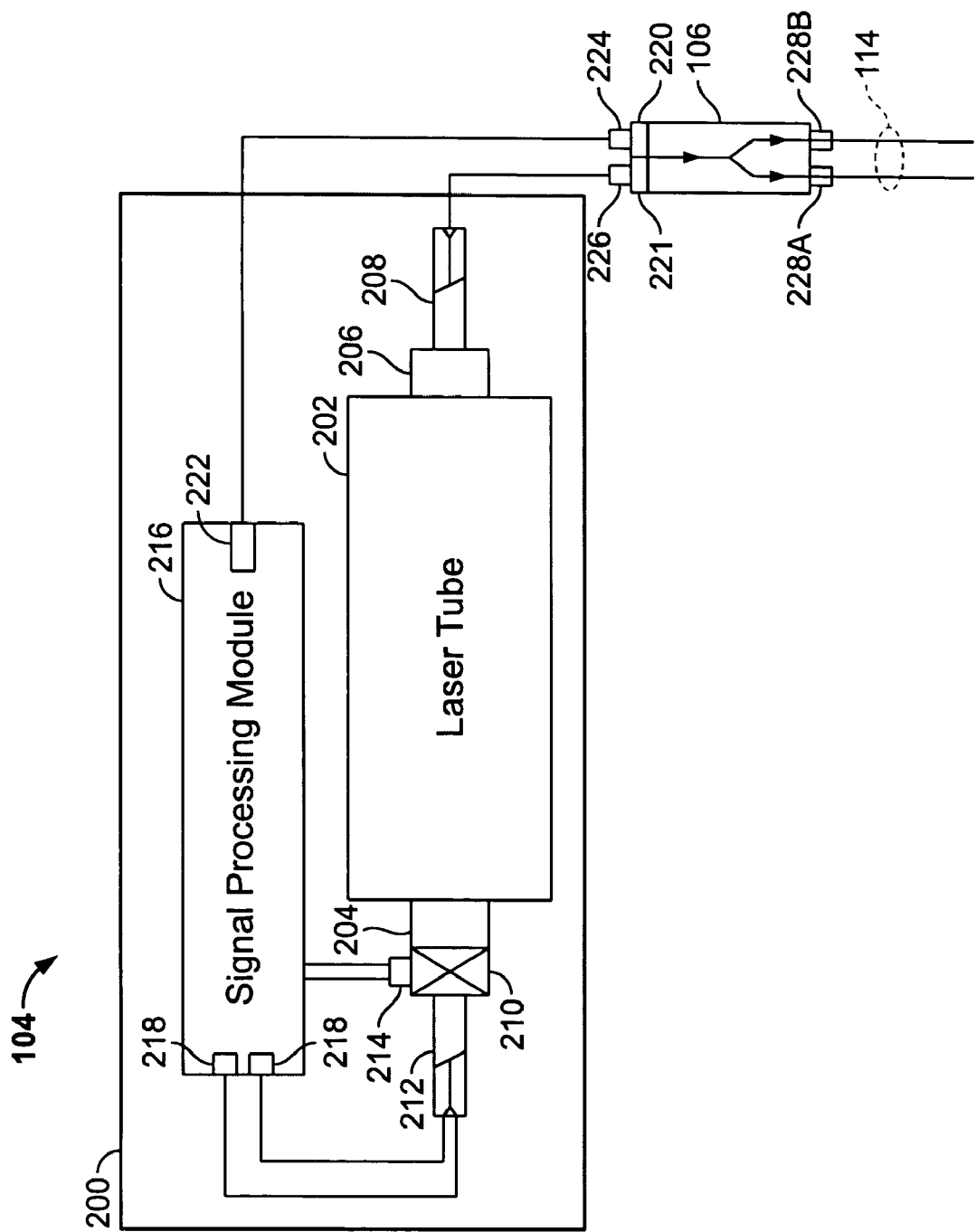
FIG. 2 shows an embodiment of a laser module and circulator in the system of FIG. 1.

FIG. 2 illustrates a particular embodiment of laser module 104. In the depicted embodiment, laser module 104 includes a laser source 200 that produces a heterodyne beam, which is transmitted to circulator 106. Circulator 106 separates the heterodyne beam into two beams, corresponding to polarization modes $p_1$ and $p_2$, which are transmitted to interferometer head 108 using optical paths 114A and 114B. Circulator 106 also receives returned beams from interferometer head 108 and provides them to a photodetector 222 in laser source 200 for optical measurements.

Laser source 200 includes a laser tube 202 and a signal-processing module 216. Laser tube 202 is an optical medium for producing heterodyne beams. Generating the heterodyne beam involves producing two polarizations that are slightly separated in frequency. One common method used to generate heterodyne beams is Zeeman splitting. Zeeman splitting involves the application of a magnetic field to produce a small separation between polarization-sensitive energy levels in the lasing medium. As one example, helium-neon (HeNe) lasers are amenable to the use of Zeeman splitting. However, it is important to note that Zeeman splitting is only one method for generating heterodyne beams and that the various embodiments described herein may be used for any heterodyne beam, regardless of how it is produced. For example, acousto-optical modulators can also be used to produce heterodyne beams.

Laser tube 202 has a low power output 204 and a high power output 206. High power output 206 emits an output beam into a collimator 208 that in turn couples to a polarization-maintaining fiber, which transmits the output beam from laser tube 202 to circulator 106. Low power output 204 provides a low power beam to splitter 210, which divides the beam emitted by low-power output 204 into two reference beams. One reference beam is coupled to a photodetector 214 that provides measurements of the heterodyne beat frequency. The other beam is split into two polarized beams by reference optics 212 in order to measure the relative amplitudes of the two polarization components produced by laser tube 202. Reference optics 212 may include any suitable optical components for dividing the beams as described, such as beam splitters, Wollaston prisms, polarizers, or numerous other optical components. Signal processing module 216 receives the reference beams at photodetectors 218.

Signal processing module 216 may be any circuit, processor, or other electronics for processing and/or analyzing signals received from photodetectors 214, 218, and 222. Photodetectors 214, 218, and 222 may include any manner of sensor for measuring light intensity, including charge controlled devices (CCDs), light meters, photodiodes, photo multiplier tubes (PMT), or other similar devices. Such devices may also include circuitry for computing the frequency of received light. Signal processing module 216 may also include suitable control circuitry for controlling laser tube 202 in response to variations in light intensity detected by photodetectors 214, 218, and 222.

The depicted embodiment shows laser tube 202 generating a single output beam, but it is also possible to use power-splitting optics to produce one or more additional output beams. In that case, additional collimators 208, circulators 106, and photodetectors 222 may be added to make interferometry measurements using the additional beams. Thus, for example, three beams could be used to measure the position of a measurement object 112 in three dimensions. Accordingly, it should be understood that any description of embodiments using one output beam from laser module 104 may be adapted to use multiple beams as well.

The fibers or other optical media used to couple collimator 208 to circulator 106 and circulator 106 to signal processing module 216 may be subject to optical effects that change with temperature variation or mechanical stress. Reducing the length of the fiber helps to limit these effects, as does physically constraining the movement of the fiber using tape or any other suitable technique for holding the fiber in place. Another technique that helps to compensate for birefringence is cutting the fiber in half, rotating one of the halves with respect to the other by, e.g., 90 degrees, and splicing the fiber back together. Particularly if the fiber is short, the response of the fiber to temperature variations and mechanical stress will not vary much over the length of the fiber, so that after the halves are spliced together, the transmission effects in the first half of the fiber on each polarization will be nearly equivalent to the effects of the second half of the fiber on the other polarization. The net result is that both polarizations will be subject to nearly identical transmission effects from traveling through the fiber, even when the birefringence of the fiber varies.

Turning now to the description of circulator 106, circulator 106 is an optical device that separates the output beam of laser module 104 into two polarized beams, receives light from interferometer head 108, and transmits the received light to photodetector 222 in signal processing module 216. The received light is in turn used to measure interference effects corresponding to the position of measurement object 112. Circulator 106 may include any suitable combination of lenses, prisms, wave plates, rotators, splitters, crystals, collimators, and/or numerous other optical components. Circulator 106 may also include a polarizer 220 that mixes polarization modes of the light transmitted to signal processing module 218 at output port 224 of circulator 106 in order to allow measurements of the optical properties of the returned beams. Polarizer 220 may be formed from any suitable optical material, such as Polarcor glass. Polarizer 220 may be integral to circulator 106 or may be separated from circulator 106. In order to provide structural balance between output port 224 and input port 226, glass 221 of the same thickness as polarizer 220 may be placed at input port 226 of circulator 106.

In general, circulator 106 includes four ports: output port 224, input port 226, and bidirectional ports 228A and 228B (collectively referred to as "bidirectional ports 228"). Each port is configured to send and/or receive one or more polarization modes. Input port 226 is configured to receive a heterodyne beam including both polarization modes and to transmit one polarization mode out of bidirectional port 228A and another polarization mode out of bidirectional port 228B. Bidirectional ports 228 are in turn configured to receive returned beams of the opposite frequency that they transmitted and to in turn provide such returned beams to output port 224. Bidirectional ports 228 may also be configured to reject unexpected polarization modes in order to partially compensate for effects such as polarization mixing. In principle, there are numerous arrangements of optical components that could be used to perform the described functions of ports 224, 226, and 228, and particular embodiments of system 100 may allow circulator 106 to be replaced with a conventional optical circulator, such as embodiments that replace optical paths 114 with a single fiber.

Figure 3A:
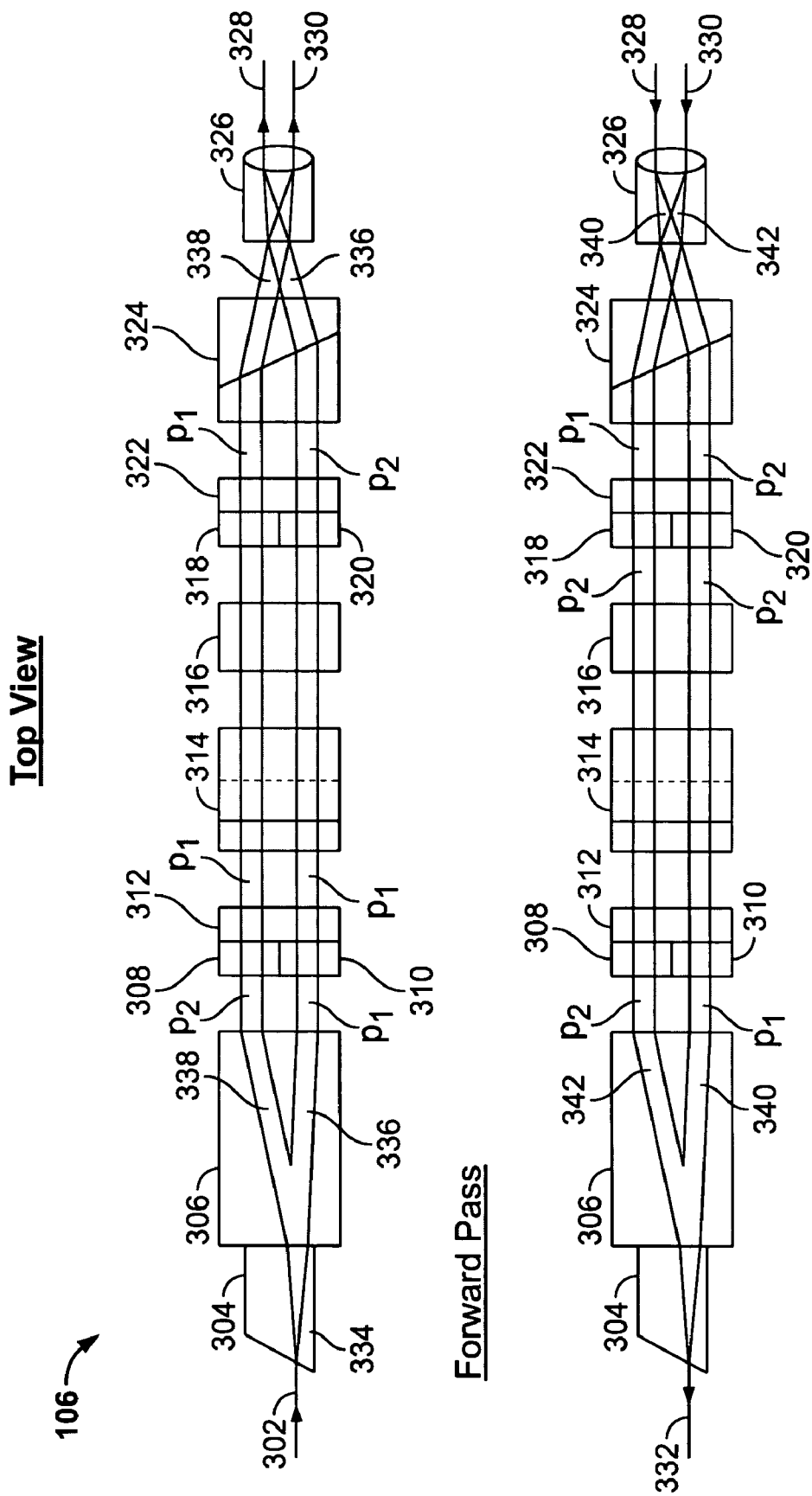
FIGS. 3A and 3B are top and side views, respectively, of an embodiment of a circulator in the system of FIG. 1.
Figure 3B:
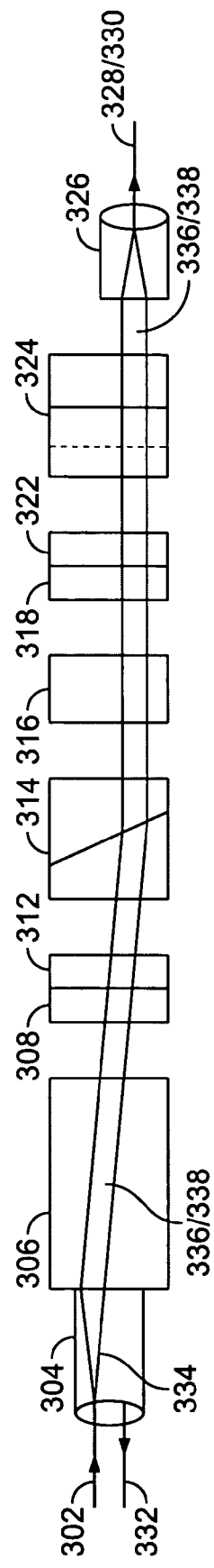
Figure 3B:
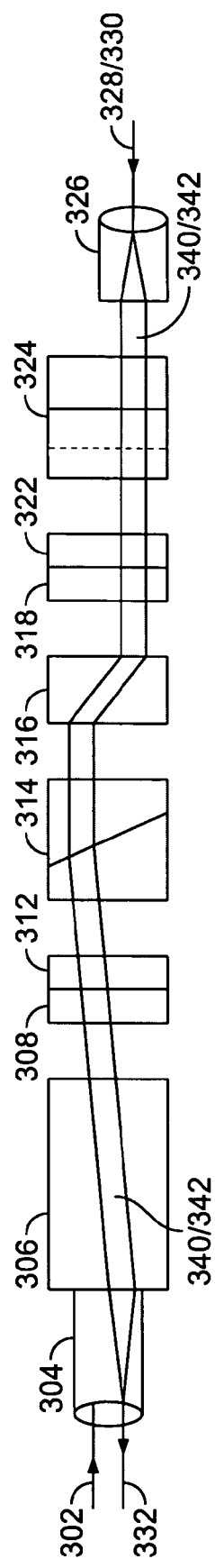

A particular example of a circulator 106 that functions as described above is depicted in FIGS. 3A and 3B. FIGS. 3A and 3B illustrate top and side views (respectively) of an embodiment of circulator 106 that may be employed in system 100. The use of the terms "top" and "side" does not indicate any particular direction, but rather is used to show relative positions of components. In each of FIGS. 3A and 3B, circulator 106 is depicted in two modes of operation: receiving the heterodyne beam from laser source 200 in a first mode, and receiving returned beams from interferometer head 108 in a second mode. In order to provide a more clear description of the operation of circulator 106, it is useful to describe the individual components of circulator 106 in greater detail.

Circulator 106 is coupled to four optical fibers corresponding to the four ports described above in conjunction with FIG. 2. The four fibers, which may be any suitable optical fibers, include an input fiber 302, an output fiber 332, and two bidirectional fibers 328 and 330. In particular embodiments, fibers 302, 328, 330, and 332 are polarization-maintaining fibers. In such embodiments, a polarization mode transmitted on a particular fiber may be selected to correspond to a fast or slow axis of the polarization-maintaining fiber if desired. In various embodiments, fibers 302, 328, 330, and 332 may be, for example, bow-tie or panda fibers. Lenses 304 and 326 receive beams from fibers 302, 328, and 330 and also direct beams into fibers 328, 330, and 332. Lenses 304 and 326 may be any type of optical lens, including a gradient index (GRIN) lens, which is suitable for expanding beams received from fibers 302, 328, and 330 and focusing beams into fibers 328, 330, and 332.

Components 308, 310, 318, and 320 are half wave plates, which are birefringent optical components that retard light polarized along one axis relative to light polarized along another axis by a half-wave (i.e., a phase-shift of pi). The half wave plates rotate an input linear polarization by an amount corresponding to their orientation relative to the input polarization.

Optical rotators 312 and 322 are non-reciprocal optical components that rotate the polarization of beams passing through each rotator by a certain amount independent of which way light passes through them. An example of a component that performs such rotations is a Faraday rotator. Faraday rotators may vary in length significantly depending on the desired spectrum of operation (near-infrared, visible, etc.), and the depicted configuration is adaptable to such varying lengths.

Walk-off crystals 306 and 316 translate a particular polarization mode in space relative to the other mode. Thus, the effect of a walk-off crystal may be to produce two polarized beams with a spatial separation between them in one direction or to combine two spatially-separated polarized beams into a single beam. Wollaston prisms 314 and 324 perform a similar function, but instead of a spatial translation, Wollaston prisms 314 and 324 introduce an angular separation between polarization modes of a combined beam traveling through Wollaston prism 314 or 324 in a certain direction. Conversely, Wollaston prisms 314 and 324 are also able to combine two polarized beams traveling along different angles into a single beam.

In the first mode of operation, circulator 106 receives a heterodyne beam 334 from input fiber 302. Lens 304 collimates the beam, and walk-off crystal 306 creates a spatial separation in the expanded beam between the two polarization modes, creating two polarized beams, beam 336 having linear polarization $p_1$ and beam 338 having orthogonal linear polarization $p_2$. The beams are in turn subjected to respective half wave plates 308 and 310, which are aligned to rotate the linear polarizations of the beams by 45-degrees in opposite directions. The beams then pass through Faraday rotator 312, which rotates the linear polarizations of both beams by 45-degrees in the same direction. The net effect of these components is that both beams 336 and 338 now have the same polarization, corresponding to $p_1$. As shown in the side view, Wollaston prism 314 receives beams 336 and 338 obliquely and straightens the travel path for both beams 336 or 338. Note that Wollaston prism 314 affects both beams identically because the polarization of the beams are the same. The beams then pass straight through walk-off crystal 316. Both beams 336 and 338 then pass through respective half wave plates 318 and 320, which are oriented to rotate the linear polarizations of the beams by 45-degrees in opposite directions. They then pass through Faraday rotator 322, which rotates the linear polarizations of the two beams by 45-degrees in the same direction. As a result, the polarization of beam 338 is $p_1$ and the polarization of beam 336 is $p_2$. Wollaston prism 324 then directs beam 336 to bidirectional fiber 330 and beam 338 to bidirectional fiber 328. Lens 326 focuses the beams on their respective fibers.

In the second mode of operation, beam 340 with polarization $p_1$ is received from bidirectional fiber 328, while beam 342 with polarization $p_1$ is received from bidirectional fiber 330. Wollaston prism 324 straightens the beam paths of both beams 340 and 342. The beams then pass through respective half wave plates 318 and 320 and Faraday rotator 322, which transforms the linear polarizations of beams 340 and 342 to the same polarization, which is polarization $p_2$. Walk-off crystal 316 translates the beams in the vertical direction, while Wollaston prism 314 directs both beams 340 and 342 along an angle toward output fiber 332. Faraday rotator 312 and half wave plates 308 and 310 have the net effect of rotating the polarization of beam 340 to $p_1$ and leaving polarization of beam 342 unchanged as $p_2$. Walk-off crystal 306 then recombines beams 340 and 342 into a combined beam 344 that is focused into output fiber 332 by lens 304.

Figure 4:
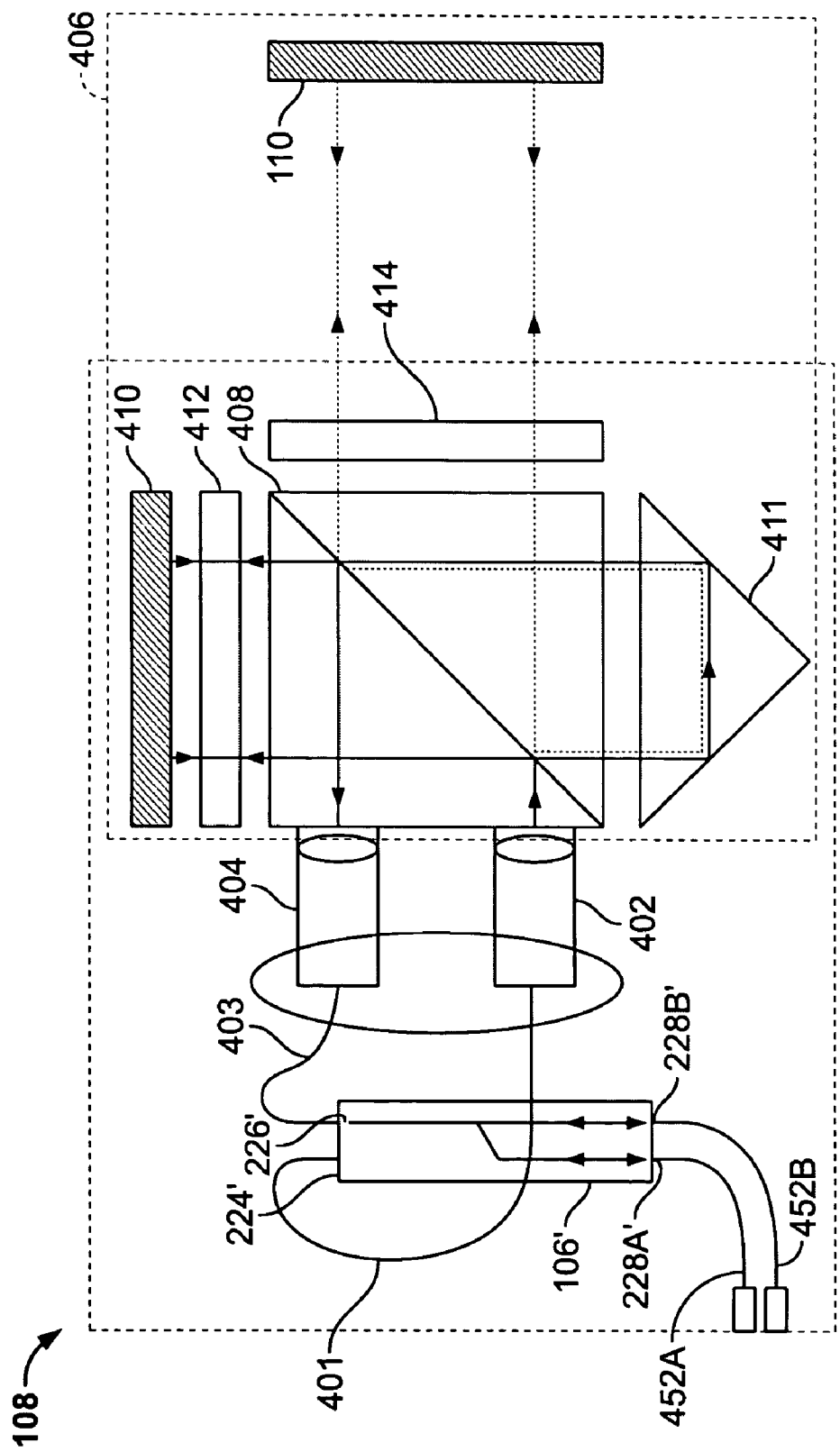
FIG. 4 is an embodiment of an interferometer head in the system of FIG. 1.

FIG. 4 depicts an embodiment of interferometer head 108 that uses a second circulator 106' on the receiving end to recombine the polarized beams from optical paths 114A and 1114B into a combined beam. Circulator 106' is identical to circulator 106 in FIGS. 3A and 3B. Fiber connector 452A connects optical path 114A to bidirectional port 228A' of circulator 106', and fiber connector 452B connects optical path 114B to bidirectional port 228B' of circulator 106'. In the depicted embodiment, interferometer head includes an interferometer 406 with an input port 402, which receives the combined beam from output port 224' of circulator 106' via polarization maintaining optical fiber 401. In the interferometer 406, a polarizing beam splitter cube 408 is disposed to split the combined beam into a reference beam (depicted by a solid line) and a measurement beam (depicted as a dotted line), corresponding to orthogonal linear polarizations $p_1'$ and $p_2'$, respectively, which are reflected from a reference mirror 410 and reflector 110, respectively. Interferometer 406 also includes quarter wave plates 412 and 414 and a retro reflector cube 411 to produce the desired optical paths for each beam. Each quarter wave plate is oriented so that a double pass through it causes a beam that is first reflected from the interface in polarizing beam splitter cube 408 to then be reflected from the interface and vice versa.

Specifically, the combined beam from input port 402 is separated into a reference beam (solid line) initially having polarization $p_1'$ and a measurement beam (dotted line) initially having polarization $p_2'$ by the polarizing beam splitting interface of cube 408. The reference beam reflects from the interface and then reflects from reference mirror 410, double passing quarter wave plate 412 in the process, which thereby rotates its polarization from $p_1'$ to $p_2'$. The reference beam is then transmitted by the polarizing beam splitting interface of cube 408 and retroreflects from retro reflector cube 411, whereupon it is again transmitted by the polarizing beam splitting interface of cube 408. It then reflects from reference mirror 410, again double passing quarter wave plate 412, which rotates its polarization from $p_2'$ back to $p_1'$, so that it is reflected by the polarizing beam splitting interface of cube 408 to output port 404.

On the other hand, the measurement beam transmits through the polarizing beam splitting interface of cube 408 and then reflects from reflector 110, double passing quarter wave plate 414 in the process, which thereby rotates its polarization from $p_2'$ to $p_1'$. The measurement beam is then reflected by the polarizing beam splitting interface of cube 408 and retroreflects from retro reflector cube 411, whereupon it is again reflected by the polarizing beam splitting interface of cube 408. It then reflects from reflector 110, again double passing quarter wave plate 414, which rotates its polarization from $p_1'$ back to $p_2'$, so that it is recombined with the reference beam and transmitted by the polarizing beam splitting interface of cube 408 to output port 404. The recombination of the reference and measurement beams produce an optical interference signal between frequency components $f_1$ and $f_2$, which is indicative of changes in the position of reflector 110 relative to the interferometer head.

After the beams are recombined, they are transmitted to input port 226' of circulator 106' from output port 404 via polarization maintaining optical fiber 403. The axes of polarization maintaining optical fibers 401 and 403 are oriented at 90 degrees to one another at the input and output ports of the circulator 106' to swap the polarizations of frequency components $f_1$ and $f_2$. This can be done, for example, by physically rotating one or both of optical fibers 401 and 403 between circulator 106' and ports 402 and 404, respectively. As a result, the frequency component that left circulator 106' with polarization $p_2$, e.g., frequency component $f_1$ now enters circulator 106' with polarization $p_1$, whereas the other frequency component that left circulator 106' with polarization $p_1$, e.g., frequency component $f_2$, now enters circulator 106' with polarization $p_2$.

Circulator 106' then separates the combined beam into the polarized components and returns each of the polarized beams to the optical paths 114A or 114B from which the respective polarization was originally received by circulator 106'. For example, if circulator 106' received a polarized beam of frequency $f_1$ and polarization $p_1$ from optical path 114A, it would return that beam component (i.e., the one with frequency $f_1$) to optical path 114B with polarization $p_2$. Similarly, if circulator 106' received a polarized beam of frequency $f_2$ and polarization $p_2$ from optical path 114B, it would return that beam component (i.e., the one with frequency $f_2$) to optical path 114A with polarization $p_1$. This compensates for path-dependent and polarization-dependent effects that could negatively affect interferometry measurements because each frequency component travels along the same optical path to and from the interferometer. Specifically, each frequency component travels along optical path 114A with polarization pi and along optical path 114B with polarization $p_2$, although they do it at different times. That is, frequency component $f_1$ travels to interferometer head 108 along optical path 114A and returns along optical path 114B, whereas frequency component $f_2$ travels to interferometer head 108 along optical path 114B and returns along optical path 114A.

Figure 5A:
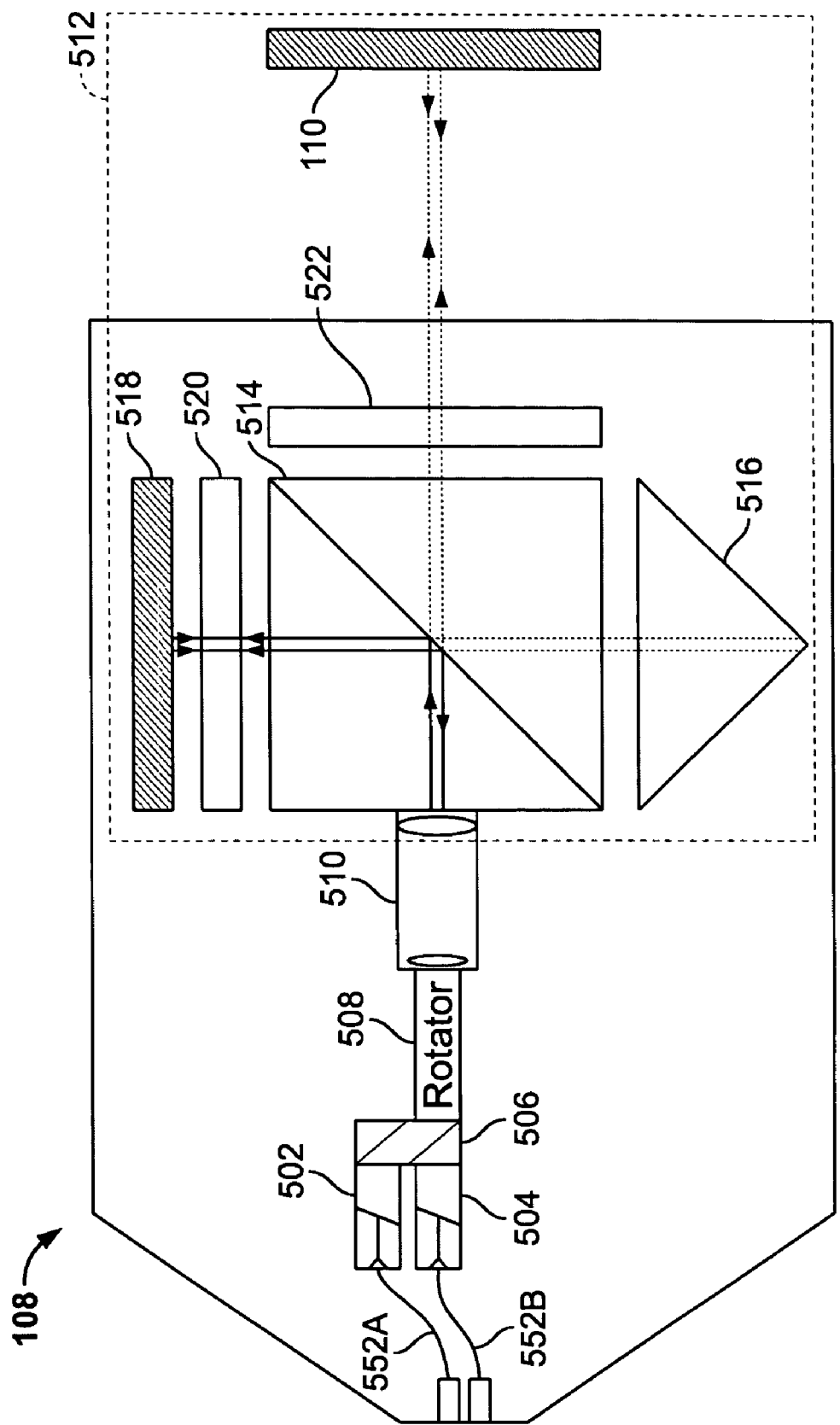
FIGS. 5A and 5B illustrate other embodiments of the interferometer head in the system of FIG. 1.

FIG. 5A illustrates an embodiment of interferometer head 108 that receives the polarized beams from optical paths 114 without using circulator 106' to receive the beams. Fiber connectors 552A and 552B connect optical paths 114A and 114B to input ports 502 and 504, respectively. In the depicted embodiment, interferometer head includes an interferometer 512 that receives two polarized input beams with different polarizations at input ports 502 and 504. A polarization splitter-combiner 506, which may be any optical component suitable for splitting and combining polarizations, combines the input beams and provides the combined beam to a Faraday rotator 508. The Faraday rotator rotates the linear polarizations of the frequency components $f_1$ and $f_2$ of the combined beam by forty-five degrees. The beam is then provided to a beam expander 510. The expanded beam then passes into interferometer 512, which is substantially similar to interferometer 406 in FIG. 4, except that the reference and measurement beams each propagate along substantially the same path when they double pass the reference mirror 518 and reflector 110, respectively.

Specifically, the expanded beam is separated into a reference beam (solid line) initially having polarization $p_1'$ and a measurement beam (dotted line) initially having polarization $p_2'$ by the polarizing beam splitting interface of a polarizing beam splitter cube 514. The reference beam reflects from the interface and then reflects from reference mirror 518, double passing quarter wave plate 520 in the process, which thereby rotates its polarization from $p_1'$ to $p_2'$. The reference beam is then transmitted by the polarizing beam splitting interface of cube 514 and retroreflects from retro reflector cube 516, whereupon it is again transmitted by the polarizing beam splitting interface of cube 514. It then reflects from reference mirror 518, again double passing quarter wave plate 520, which rotates its polarization from $p_2'$ back to $p_1'$, so that it is reflected by the polarizing beam splitting interface of cube 514 to beam expanded 510.

On the other hand, the measurement beam transmits through the polarizing beam splitting interface of cube 514 and then reflects from reflector 110, double passing quarter wave plate 522 in the process, which thereby rotates its polarization from $p_2'$ to $p_1'$. The measurement beam is then reflected by the polarizing beam splitting interface of cube 514 and retroreflects from retro reflector cube 516, whereupon it is again reflected by the polarizing beam splitting interface of cube 514. It then reflects from reflector 110, again double passing quarter wave plate 522, which rotates its polarization from $p_1'$ back to $p_2'$, so that it is recombined with the reference beam and transmitted by the polarizing beam splitting interface of cube 514 to beam expander 510. The recombination of the reference and measurement beams produce an optical interference signal between frequency components $f_1$ and $f_2$, which is indicative of changes in the position of reflector 110 relative to the interferometer head.

In some cases, using the central part of the aperture of retro reflector cube 516 may create wavefront distortion and/or loss of light, in which case a lens, such as a GRIN lens, with a mirror placed at its back focus may be substituted for retro reflector cube 516.

After passing back through beam expander 510, which condenses it, the combined beam again passes through Faraday rotator 508, further rotating the linear polarizations of frequency components $f_1$ and $f_2$ by another 45 degrees. As a result, for example, the frequency component that entered rotator 508 with polarization $p_1$, e.g., frequency component $f_1$, now leaves rotator 508 with polarization $p_2$, and the frequency component that entered rotator 508 with polarization $p_2$, e.g., frequency component $f_2$, now leaves rotator 508 with polarization $p_1$. Beam splitter/combiner 506 then separates the combined beam into its polarization components, with the frequency component exiting rotator 508 with polarization $p_1$ (e.g., frequency component $f_2$) being coupled to optical path 114A via port 502 and fiber connector 552A and the frequency component corresponding to polarization $p_2$ (e.g., frequency component $f_1$) being coupled to optical path 114B via port 504 and fiber connector 552B.

The double pass through Faraday rotator 508 swaps the polarizations for frequency components $f_1$ and $f_2$. As a result, the frequency component that entered interferometer head 108 with polarization $p_1$, e.g., frequency component $f_1$, now leaves interferometer head 108 with polarization $p_2$, and the frequency component that entered interferometer head 108 with polarization $p_2$, e.g., frequency component $f_2$, now leaves interferometer head 108 with polarization $p_1$. As in the embodiment of FIG. 4, this advantageously reduces path-dependent and polarization-dependent effects that might otherwise affect the accuracy of the interferometry measurements because each frequency component travels along the same optical path to and from the interferometer.

Figure 5B:
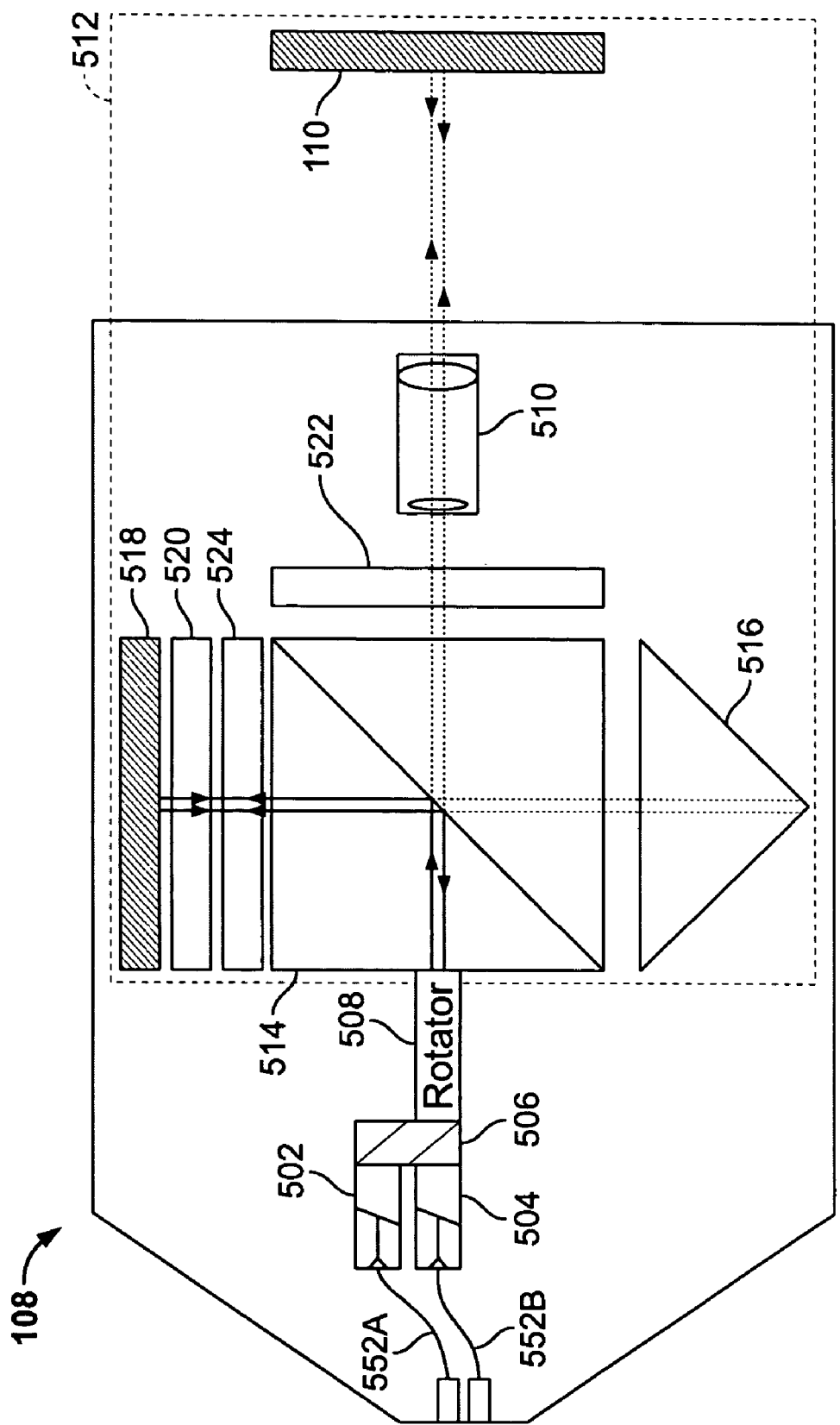

FIG. 5B illustrates a modified version of the interferometer head shown in FIG. 5A. In the modified version, beam expander 510 is placed between reflector 110 and polarizing beam-splitter cube 514. This may allow interferometer head 108 to be constructed more compactly. Because beam expander 510 only expands the measurement path, there may be disparate optical effects between the reference path and the measurement path. Accordingly, a compensator plate 524 may be placed in the reference path to compensate for such optical effects. For example, compensator plate 524 may be a glass plate formed from the same material as the lenses used in beam expander 510. The total thickness of compensator plate 524 may be selected to match the total thickness of the lenses in beam expander 510.

Figure 6:
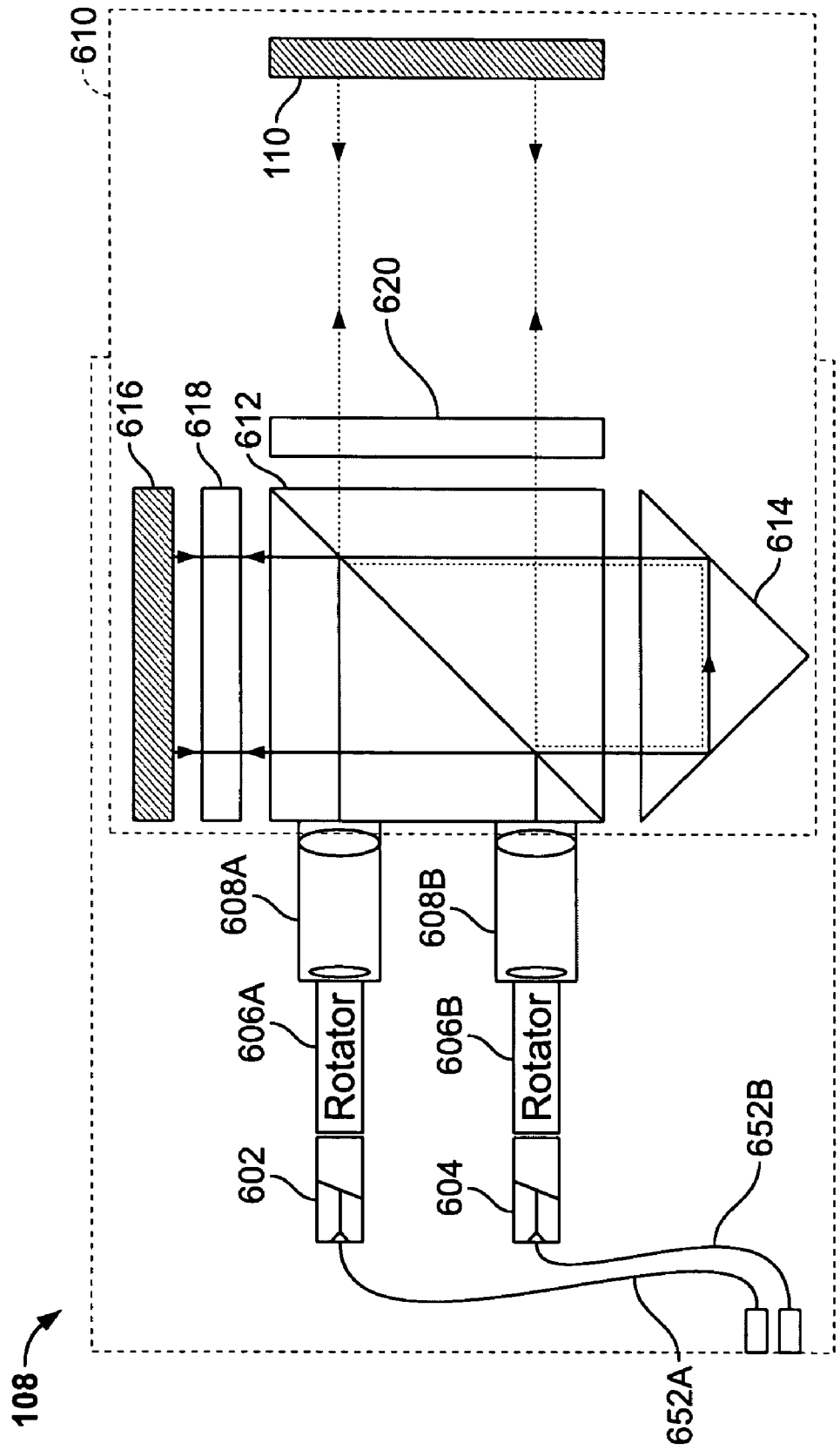
FIG. 6 illustrates another embodiment of the interferometer head in the system of FIG. 1.

FIG. 6 is another embodiment of interferometer head 108. In the depicted embodiment, interferometer head 108 has two ports 602 and 604. Port 602 is coupled to a Faraday rotator 606A and a beam expander 608A. Port 604 is coupled to a Faraday rotator 606B and beam expander 608B. Interferometer 610 includes an arrangement of a polarizing beam splitter cube 612, retro reflector cube 614, mirror 616, reflector 110, and quarter wave plates 618 and 620, which is similar to those described above with reference to FIGS. 4, 5A, and 5B. Fiber connectors 652A and 652B connect optical paths 114A and 114B to input ports 602 and 604, respectively. In this embodiment, the frequency component, e.g., $f_1$, corresponding to the reference beam (solid line following the beam-splitting interface) enters the interferometer through port 602 and exits through port 604 after double passing reference mirror 616, whereas the frequency component, e.g., $f_2$, corresponding to the measurement beam (dotted line following beam-splitting interface) enters the interferometer through port 604 and exits through port 602 after double passing reflector 110. Interferometer 610 includes two additional features. First, like interferometer 406 depicted in FIG. 4, interferometer 610 uses spatially separated beam paths for the two passes of the reference and measurement beams to the reference mirror and object mirror, respectively. But like the interferometers depicted in FIGS. 5A and 5B, interferometer 610 includes a Faraday rotator, specifically Faraday rotators 606A and 606B, that are used to rotate the polarization of frequency components $f_1$ and $f_2$.

Figure 7:
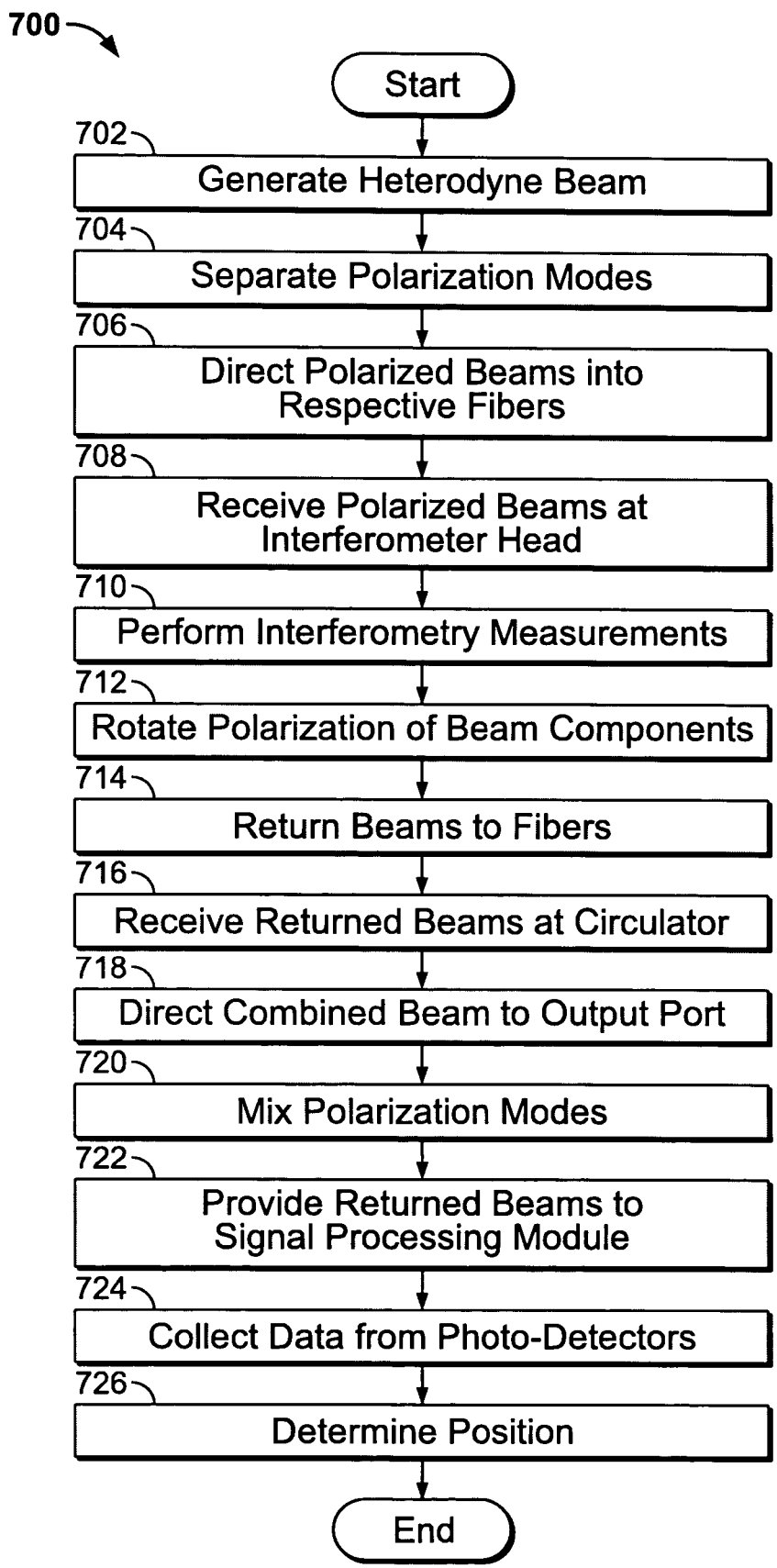
FIG. 7 is a flow chart that illustrates an example method of operation for the system of FIG. 1.

FIG. 7 is a flow chart 700 showing an example of a method of operation for system 100 in which the heterodyne beam is transmitted to interferometer head 108 using a two-fiber optical connection 114. Laser module 104 generates a heterodyne beam at step 702. Circulator 106 separates the polarization modes into two beams at step 704, and the beams are directed into fibers of optical connection 114 at step 706. Interferometer head 108 receives the beams at step 708.

Interferometer head 108 then performs interferometry measurements using the beams at step 710. As described above, the interferometry measurements may be performed using overlapping paths, in which case the two beams may be combined, or may be performed with separate measurement and reference paths. Interferometer head 108 rotates the polarization of the beams at step 712. These rotations may be performed in a variety of different ways. For example, interferometer head 108 could perform part of the rotation upon receiving the beams at interferometer head 108 and complete the rotation when returning the beams to optical paths 114. The rotation may be performed on each beam separately, or alternatively, the beams may be combined and the rotation performed in the combined beam. Generally, any combination of steps that results in the rotation of one polarization axis to a different polarization axis may be employed, and any suitable modifications may be made in order to produce a desired interferometer configuration.

Once the interferometry measurements have been made and the polarization of the beams rotated, interferometer head 108 then returns the beams to optical paths 114 at step 714. Interferometer head 108 may advantageously return a beam received from one optical path 114 to the other optical path 114 in order to reduce the impact of path-dependent effects. Circulator 106 receives the returned beams from optical connection 114 at step 716, and directs a combined beam to output port 224 at step 718. Polarizer 220 mixes the polarization modes of the combined beam at step 720, and the resulting beam is provided to signal processing module 216 at step 722. Signal processing module 216 then collects information from photodetector 222 at step 724, and computer 102 analyzes the collected information to determine a position for measurement object 112 at step 726.

Although a particular method of operation using two optical paths 114 has been described, other methods of operation may be suitable in embodiments of system 100 using two-fiber optical connections 114, and other embodiments may have suitable methods of operation as well. Consequently, it should be understood that the described method of operation is an example that may be suitably modified in any manner consistent with any of the various embodiments of system 100. Furthermore, the steps of the particular method described may be performed in a different order, and steps may be omitted or added in any suitable way.

A number of embodiments of the invention have been described. Nevertheless, it will be understood that various modifications may be made without departing from the spirit and scope of the invention. For example, particular optical components (e.g., prisms, crystals, Faraday rotators) and collection of components have been described, but other optical components or collections of components performing equivalent functions may be substituted in the place of the described components. With respect to the overall system, modifications such as using a single optical path 114, performing different rotations or no rotations of the polarization, and numerous other modifications consistent with particular functions of various embodiments, may be employed as desired or necessary for particular applications. Accordingly, other embodiments are within the scope of the following claims.

What is claimed is:

1. A method, comprising:
    directing a beam to an interferometer head using an optical connection, the beam comprising a first beam component having a first polarization and a first frequency and a second beam component having a second polarization different from the first polarization and a second frequency;
    rotating the polarization of the first beam component to the second polarization;
    rotating the polarization of the second beam component to the first polarization; and
    returning the beam with the rotated polarizations from the interferometer head using the optical connection.

2. The method of claim 1, wherein the steps of rotating the polarization of the first beam component and rotating the polarization of the second beam component are performed using at least one Faraday rotator.

3. The method of claim 1, wherein the method further comprises separating the first beam component from the second beam component; and the step of directing comprises:
    directing the first beam component into a first fiber of the optical connection; and
    directing the second beam component into a second fiber of the optical connection.

4. The method of claim 3, wherein the first fiber and the second fiber are polarization-maintaining fibers.

5. The method of claim 3, wherein the first beam component is returned using the second fiber; and the second beam component is returned using the first fiber.

6. The method of claim 1, further comprising mixing the first beam component and the second beam component using a polarizer.

7. The method of claim 1, wherein the first beam component and the second beam component are transmitted in the optical connection as a single beam; and
    the steps of rotating the polarization of the first beam component and rotating the polarization of the second beam component are performed simultaneously on the single beam.

8. The method of claim 1, wherein the measurement object is a wafer stage.

9. The method of claim 1, wherein the beam is a heterodyne beam with the second frequency being different from the first frequency.

10. An apparatus, comprising:
    a laser module operable to generate a beam, the beam comprising a first beam component having a first polarization and a first frequency and a second beam component having a second polarization different from the first polarization and a second frequency;
    an interferometer head;
    an optical connection between the laser module and the interferometer head; and
    one or more optical rotators coupled to the optical connection, wherein the one or more optical rotators are collectively operable to rotate the polarization of the first beam component to the second polarization and further operable to rotate the polarization of the second beam component to the first polarization.

11. The apparatus of claim 10, wherein the one or more optical rotators comprise one or more Faraday rotators.

12. The apparatus of claim 10, wherein the optical connection comprises a first fiber and a second fiber.

13. The apparatus of claim 12, wherein the first fiber and the second fiber are polarization-maintaining fibers.

14. The apparatus of claim 10, further comprising a polarizer coupled to the laser module and the optical connection, the polarizer operable to mix the first beam component with the second beam component.

15. The apparatus of claim 10, fun her comprising a measurement object optically coupled to the interferometer head, wherein the interferometer head is operable to produce an interference signal indicative of the position of the measurement object.

16. The apparatus of claim 15, wherein the measurement object is a wafer stage.

17. The apparatus of claim 10, wherein the beam is a heterodyne beam with the second frequency being different from the first frequency.

18. An apparatus, comprising:
a laser module operable to generate a beam, the beam comprising a first beam component having a first polarization and a first frequency and a second beam component having a second polarization different from the first polarization and a second frequency;
an interferometer head; and
an optical connection between the laser module and the interferometer head, the optical connection comprising a first fiber operable to direct the first beam component to the interferometer and a second fiber operable to direct the second beam component to the interferometer, wherein the interferometer head is configured to return the first beam component to the second fiber and to return the second beam component to the first fiber.

19. The apparatus of claim 18, wherein the interferometer head comprises:
a first port operable to receive the first beam component from the first fiber;
a second port operable to receive the second beam component from the second fiber;
a first optical rotator coupled to the first port operable to rotate the polarization of the first beam component; and
a second optical rotator coupled to the second port operable to rotate the polarization of the second beam component.

20. The apparatus of claim 19, further comprising a first beam expander coupled to the first optical rotator and a second beam expander coupled to the second optical rotator.

21. The apparatus of claim 19, wherein the optical rotators comprise Faraday rotators.

22. The apparatus of claim 19, wherein the interferometer head is configured to receive the first beam component and the second beam component such that the first beam component and the second beam component travel within the interferometer head on different beam paths.

23. The apparatus of claim 18, wherein the interferometer head comprises:
a polarization splitter/combiner operable to receive the first beam component from the first fiber and the second beam component from the second fiber, and combine the first and second beam components into a combined beam; and
an optical rotator operable to rotate the polarization of the first and second beam components in the combined beam.

24. The apparatus of claim 23, wherein the optical rotator is a Faraday rotator.

25. The apparatus of claim 23, wherein the interferometer head further comprises a beam expander.

26. The apparatus of claim 25, wherein the beam expander is coupled to the optical rotator.

27. The apparatus of claim 25, wherein the beam expander is disposed on a measurement path between the interferometer head and a measurement object, and the interferometer head further comprises a collimator compensator plate disposed in a reference path of the interferometer to compensate for unequal phase effects between the reference path and the measurement path caused by the beam expander.

28. The apparatus of claim 18, wherein the beam is a heterodyne beam with the second frequency being different from the first frequency.

29. An apparatus comprising:
an interferometer configured to separate an input beam into two components, direct one of the components to contact a measurement object twice along a common path, and then recombine the components to produce an output beam; and
a polarization splitter/combiner operable to receive a first beam component from a first fiber and a second beam component from a second fiber, and combine the first and second beam components to generate the input beam, the polarization splitter/combiner operable to receive the output beam and split the output beam into the first beam component and the second beam component, and forward the first beam component to the second fiber and forward the second beam component to the first fiber.

30. The apparatus of claim 29, further comprising an optical rotator positioned to rotate polarizations of the components of the input beam along one direction and rotate polarizations of components of the output beam along a different direction.

31. The apparatus of claim 30, wherein the optical rotator comprises a Faraday rotator.

32. The apparatus of claim 29, wherein the interferometer comprises a polarizing beam splitter positioned to separate the input beam into the components and recombine the components to produce the output beam.

33. The apparatus of claim 32, wherein the interferometer further comprises a pair of quarter wave plates, one of the quarter wave plates positioned to receive one of the components and the other of the quarter wave plates positioned to receive the other of the components.

34. The apparatus of claim 33, wherein the interferometer further comprises a retroreflector common to the components.

35. The apparatus of claim 29, wherein the components have different polarizations and a different frequencies.

36. A method comprising:
compensating variation in optical effects that affect a first beam component and a second beam component that are used by an interferometer to measure a position of a measurement object relative to a reference object by sending the first and second beam components along a first path and a second path, respectively, from a laser generator to the interferometer, and sending the first and second beam components along the second and first paths, respectively, from the interferometer to a signal processing module.

37. The method of claim 36, wherein the first beam component has a first polarization when traveling in at least a portion of the first path and has a second polarization when traveling in at least a portion of the second path, and the second beam component has a second polarization when traveling in at least a portion of the second path and has a first polarization when traveling in at least a portion of the first path.

38. The method of claim 36, further comprising at the interferometer, passing the first beam component to the measurement object at least twice.

39. The method of claim 36, wherein the first beam component has a first frequency and the second beam component has a second frequency that is different from the first frequency.

40. The method of claim 36, wherein sending the first and second beam components along a first path and a second path, respectively, comprises sending the first and second beam components along a first fiber and a second fiber, respectively.

41. The method of claim 36, further comprising rotating the polarization of the first beam component and rotating the polarization of the second beam component.

42. The method of claim 36, further comprising separating a beam from the laser generator into the first and second beam components prior to sending the first and second beam components to the interferometer, and combining the first and second beam components from the interferometer to generate a combined beam that is sent to the signal processing module.

* * * * *

UNITED STATES PATENT AND TRADEMARK OFFICE
CERTIFICATE OF CORRECTION

PATENT NO. : 7,277,180 B2
APPLICATION NO. : 10/984545
DATED : October 2, 2007
INVENTOR(S) : Paul A. Townley-Smith and John Kondis It is certified that error appears in the above-identified patent and that said Letters Patent is hereby corrected as shown below:

Column 3
Lines 31 and 62, replace "includes" with --include--

Column 4
Line 14, replace "includes" with --include--
Line 21, delete "a" before "different"

Column 5
Line 2, insert a new paragraph after "FIG. 1"

Column 6
Line 43, replace second occurrence of "$P_1$" with --$P_2$--

Column 8
Line 34, place "beat" with --heat--

Column 11
Line 18, replace "$P_1$" with --$P_2$--

Column 12
Line 56, replace "$P_1$" with --$P_2$--

Column 17
Line 5, claim 15, after "10," replace "fun her" with --further--

UNITED STATES PATENT AND TRADEMARK OFFICE
CERTIFICATE OF CORRECTION

PATENT NO.         : 7,277,180 B2
APPLICATION NO.    : 10/984545
DATED              : October 2, 2007
INVENTOR(S)        : Paul A. Townley-Smith and John Kondis It is certified that error appears in the above-identified patent and that said Letters Patent is hereby corrected as shown below:

<u>Column 18</u>
Line 48, claim 35, after "and" delete "a"

Signed and Sealed this

Seventeenth Day of February, 2009

JOHN DOLL
*Acting Director of the United States Patent and Trademark Office*